Nov. 20, 1956  J. C. GREY  2,770,968
MASS FLOW MONITOR
Filed June 6, 1952
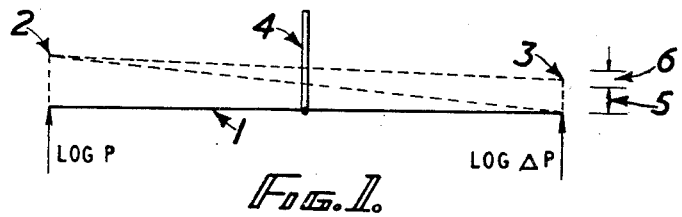
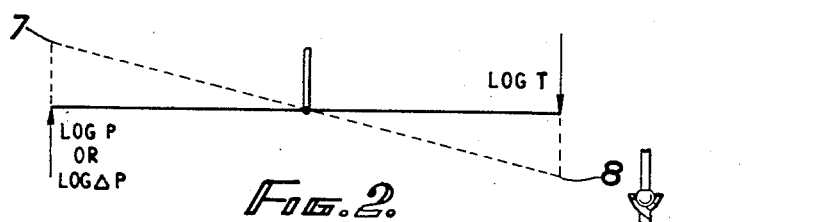
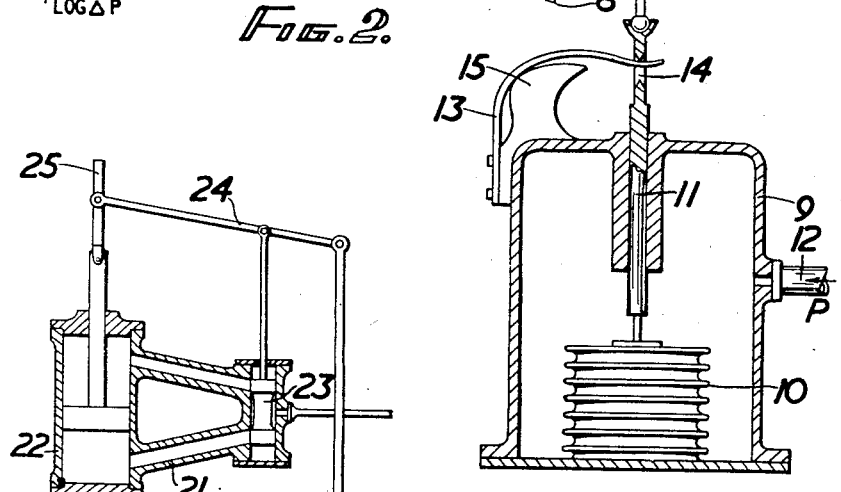
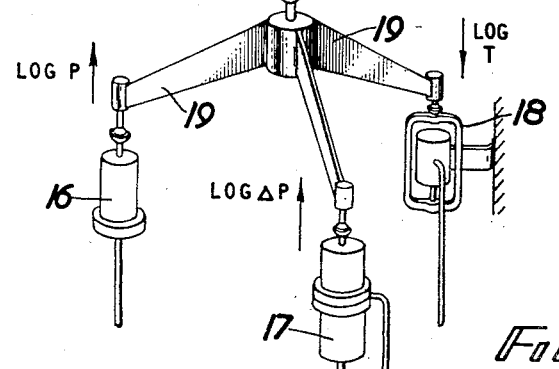
Inventor
John Constantine Grey
By Stevens, Davis, Miller & Mosher
his Attorneys

2,770,968

MASS FLOW MONITOR

John Constantine Grey, Isleworth, England, assignor to Power Jets (Research & Development) Limited, London, England, a British company Application June 6, 1952, Serial No. 292,085

Claims priority, application Great Britain June 18, 1951

2 Claims. (Cl. 73—205)

This invention relates to mass flow monitors.

In measuring the mass or volumetric flow of a fluid it is usually possible to arrange for the measuring apparatus to be located in a part of the flow where the pressure and temperature conditions vary only slightly, for example, at an air intake where atmospheric conditions prevail. However, requirements do arise where the monitoring of the flow is required and the pressure and temperature conditions at the point where measurements are to be made vary considerably, say up to 100% changes in both values. In such cases the simple measurement of P in a venturimeter, which would suffice elsewhere, becomes useless.

A main object of the invention is to provide an accurate monitor for the mass flow of a fluid under conditions of pressure and temperature which vary considerably.

Accordingly this invention provides a mass flow monitor for a fluid comprising separate means for proportionately responding to changes in absolute pressure of the fluid passing through a duct, to changes in absolute temperature of that fluid and to changes in pressure difference across a constriction in said duct adjacent the points from which the pressure and temperature responses are initiated and comprising means for producing a summation of the three responses in such a way that the aggregate response is proportional to changes in the mass flow.

Each of the three responses may take the form of linear motion of a member and those three movements may be mechanically and algebraically combined to give a resultant movement of a member which is indicative of changes in mass flow, the instantaneous position of the latter member being indicative of the absolute value of the mass flow. The responsive members may be arranged to move in logarithmic proportionality to the respective changes which cause the movements. The algebraic combination of the responses may alternatively be electrically performed. Whether mechanical or electrical means are employed magnification of the initial responses is possible, e. g. with mechanical equipment a servo-motor hydraulic system can, say, provide the power necessary to modify external conditions in a way dependent on mass flow changes.

It can be shown that for small pressure drops:

$$M^2 = \frac{KP\Delta P}{T}$$

Where $M$ = mass flow (lb./sec.)
$K$ = constant
$P$ = absolute pressure (p. s. i. a.)
$\Delta P$ = pressure drop in venturi (p. s. i.)
$T$ = absolute temperature (°K.)

For greater accuracy it is preferable that changes in P, ΔP and T should give responses which lead directly to indications of changes of mass flow. The simplest way to achieve this is to modify the above equation by taking logarithms of both sides in which case it becomes:

$$\log M = \frac{\log K + \log P + \log \Delta P - \log T}{2}$$

Use of this equation makes possible the algebraic summation of responses in a simple manner.

The invention will now be described with reference to one embodiment thereof shown in the accompanying drawings, in which:

Figure 1 shows diagrammatically a floating beam forming part of a mechanically operated mass flow monitor according to the invention and Figure 2 indicates a result of applying different forces to the beam than are shown in Figure 1.

Figure 3 shows a sectional elevation of pressure responsive device arranged to give logarithmically proportional indications of pressure changes.

Figure 4 shows a general view of the mass flow monitor with associated servo-motor.

From the general arrangement stated above it will be clear that three terms log P, log ΔP and log T have to be algebraically summated in order to give an indication of log M. In Figure 1 there will be seen a floating beam 1 and as shown it is supported at its ends by forces proportional to log P and log ΔP respectively. Increase of the forces raising the ends of the beam to the points 2 and 3 respectively cause an indicating rod 4 mounted on the centre point of the beam to be raised by the distances indicated at 5 and 6 respectively. The total distance through which the rod 4 moves is an indication of $$\tfrac{1}{2} (\log P + \log \Delta P).$$

Hence, if the temperature were constant this indication would be proportional to log M.

In the general expression for the mass flow T is found in the denominator. In the logarithmic expression its value is, therefore, negative. Mechanical indication of this fact can be given by a beam such as is shown in Figure 2 with one end responding to a downward force proportional to log T. The other end of the beam is responsive to either a force representing log P or log ΔP. Deflections of the ends to points 7 and 8 result in no displacement of the centre point to which an indicating rod is attached.

In the embodiment of the invention with which we are concerned, the displacements of the beams are made to effect one common indicating rod which, therefore, moves in proportion to log M. The detailed description of the apparatus will be given below but attention will now be turned to the means for responding logarithmically to the changes of pressure, temperature and pressure difference.

In Figure 3 there is shown a pressure responsive capsule mechanism having a sealed casing 9, an evacuated capsule 10 extended by a spring therein and an indicating rod 11. Pressure is introduced into the casing by the pipe 12 and the balance obtained between the pressure and the spring force result in the positioning of the indicating rod 11. Such pressure sensitive mechanisms are well known but in this case in order to obtain movements of the indicating rod which are logarithmic, an addition is made to the spring force extending the capsule. This takes the form of a leaf-spring 13 mounted on the outside of the casing and having its free end passing through a hole 14 in the rod 11. The spring is supported on a camming abutment 15 so that the free length of spring operable at any instant is in logarithmic relationship with the displacement of the rod 11.

The pressure difference indicator is practically identical with the pressure responsive device just described, except that the inside of the capsule 10 is connected to one of the pressures instead of being evacuated. The displacement of the indicating rod is, therefore, proportional to the difference of pressures inside and outside the capsule and the logarithmic variation is introduced as before.

It is proposed to use a known form of temperature responsive apparatus, a mercury-in-steel device being preferred because it gives rise to a pressure variation convertible into linear motion and, therefore, easily comparable with the operation of the two pressure devices. Again the variable leaf-spring is used in order to provide the logarithmic variation.

The pressure, pressure difference and temperature indicators are shown respectively in Figure 4 at 16, 17 and 18. Their respective indicating rods pivotally support the ends of a three-armed floating beam 19 so that the rods are at the corners of a triangle, which is preferably but not necessarily equilateral. Following the explanation which has been given in relation into Figures 1 and 2 and from the following argument it will be appreciated that the arm 20 has a motion indicative of log M.

Let us assume that the pressure rises, then the rod 11 of the pressure indicator 16 rises and the beam tilts about an axis through the pivot points above the indicators 17 and 18. Similarly with both of the other two variables considered one at a time. Taking the three movements of the indicator rods in these cases as $x$, $y$ and $z$ then $$x = a \log P$$
$$y = b \log \Delta P$$
$$z = -c \log T$$

where $a$, $b$ and $c$ are constants

According to the lengths of the arms 19 so the respective movements of the arm 20, neglecting the small inaccuracy due to lack of completely linear motion, are $h_x$, $h_y$ and $h_z$ where $$h_x = Aa \log P$$
$$h_y = Bb \log \Delta P$$
$$h_z = -Cc \log T$$

The total movement of the arm 20, $h$ is given by $$h = h_x + h_y + h_z = Aa \log P + Bb \log \Delta P - Cc \log T$$

Now if $h = \log M$ then $$M = \frac{K \cdot P^{Aa} \times \Delta P^{Bb}}{T^{Cc}}$$

Referring back to the original expression for M we find that in order to make this last expression identical with that formerly given, then $$Aa = \tfrac{1}{2} = Bb = Cc$$

Now if $A = B = C$, i. e. the arms 19 are of equal length then $a = b = c$ which implies that a movement of the rod 11 of the pressure responsive means 16 indicating a four-fold increase in pressure must be equalled by the movement of members responsive to the same ratio changes in the other two variables. Other choices of the extent of movements and of the relative lengths of the arms 19, or more generally of the distances between the point at which the beam affects the arm 20 and the three separate supporting points for the beam, may be chosen in accordance with the general conclusions noted above. For instance only a comparatively small temperature range, say 600–700° C. may need to be covered whilst a pressure range of 2 to 5 atmospheres may be expected. Such circumstances can be accommodated by suitable selection of the constants A, B, C, $a$, $b$, $c$.

In practice the movement in any case of the centre of the floating beam of Figure 4 would be relatively small and the force available at this point will also be small. Both the movement and the available force may be considerably increased to any required value for the operation of suitable controls, by connecting the floating beam to a hydraulic servo-motor shown at 21. The main relay cylinder 22 is double acting and receives oil under pressure, controlled by a pilot valve 23. The latter is connected to the relay piston and the floating beam by means of a restoring lever 24 and the operation of the unit is as follows:

A variation of mass flow causes a displacement of the floating beam and as the relay cylinder is temporarily fixed, the pilot admits oil to it so that the piston will move causing a contrary movement in the restoring lever. This movement will go on until the pilot is restored to its neutral position and the piston thus acquires its new equilibrium position. By suitably proportioning the lever ratios of the restoring lever, the displacement of the floating beam may be amplified considerably. The force available at the relay piston depends on its diameter and oil pressure and may thus be made as large as required.

It should be noted that the operation of the relay piston is extremely sensitive and stable. There is complete correspondence between the positions of the floating beam and the relay piston, and the operation of the unit is independent of oil viscosity and leakage past the relay piston or the pilot.

The final movement of the indicating arm 20 and the amplified movement of the servo-mechanism shown by the rod 25 are both proportional to log M. In known manner this movement may be mechanically converted, if desired, into linear motion varying directly as M.

The influence of friction on the working of the monitor shown in Figure 4 is small. A high degree of accuracy is therefore possible. If a figure of 10–20% accuracy however is all that is required the translation of the changes into logarithmic variations is not necessary. The three forces on the beam would then be P, ΔP and T in the same directions as before. Such an arrangement does not give a direct reading of M but fairly approximate readings can be obtained under certain flow conditions.

What I claim is:

1. In a fluid mass flow monitor having separate means for responding to changes in absolute pressure of the fluid passing through a duct, to changes in absolute temperature of that fluid and to changes in pressure difference across a constriction in said duct adjacent the points from which the pressure and temperature responses are initiated, each of which responsive means incorporates a member moved substantially linearly by any change in the appropriate monitored variable, a symmetrical three-legged floating beam pivotally attached at the outer end of each leg to a different one of said members, the pressure and pressure difference responsive members affecting the beam in the opposite sense to the temperature responsive member, an indicating arm pivotally attached to the center point of said beam so that it moves substantially linearly an amount equal to the algebraic sum of the movements of the three members incorporated in the responsive means.

2. In a fluid mass flow monitor having separate means for responding in logarithmic proportionality to changes in absolute pressure of the fluid passing through a duct, to changes in absolute temperature of that fluid and to changes in pressure difference across a constriction in said duct adjacent the points from which the pressure and temperature responses are initiated, each of which responsive means incorporates a member moved substantially linearly by any change in the appropriate monitored variable, a symmetrical three-legged floating beam pivotally attached at the outer end of each leg to a different one of said members, the pressure and pressure difference responsive members affecting the beam in the opposite sense to the temperature responsive member, an indicating arm pivotally attached to the center point of said beam so that it moves substantially linearly an amount equal to the algebraic sum of the movements of the three members incorporated in the responsive means and a servo-mechanism actuated by said indicating arm to produce a motion of a greater force than is available at said indicating arm through a distance greater than but proportional to said amount.

References Cited in the file of this patent

UNITED STATES PATENTS

| 1,641,195 | Roucka | Sept. 6, 1927 |
| 2,062,110 | Swartwout | Nov. 24, 1936 |
| 2,136,900 | Woolley | Nov. 15, 1938 |
| 2,160,266 | Grisdale | May 30, 1939 |
| 2,477,233 | Bristol | July 26, 1949 |
| 2,568,226 | Drake | Sept. 18, 1951 |
| 2,568,361 | Pettigrove | Sept. 18, 1951 |

FOREIGN PATENTS

| 20,360 | Great Britain | 1908 |
| 517,321 | Great Britain | Jan. 26, 1940 |